(12) United States Patent
Bacardit

(10) Patent No.: US 6,591,734 B1
(45) Date of Patent: Jul. 15, 2003

(54) SERVOMOTOR WITH A DEFORMABLE-ADJUSTABLE SLEEVE

(75) Inventor: Joan Simon Bacardit, Barcelone (ES)

(73) Assignee: Bosch Sistemas de Frenado. S.L., Barcelone (ES)

( * ) Notice: Subject to any disclaimer, the term of this patent is extended or adjusted under 35 U.S.C. 154(b) by 150 days.

(21) Appl. No.: 09/889,803
(22) PCT Filed: May 18, 2001
(86) PCT No.: PCT/EP01/06456
§ 371 (c)(1), (2), (4) Date: Jul. 20, 2001
(87) PCT Pub. No.: WO01/89899
PCT Pub. Date: Nov. 29, 2001

(30) Foreign Application Priority Data

May 22, 2000 (FR) .......................................... 00 06600

(51) Int. Cl.[7] .................................................. F15B 9/10
(52) U.S. Cl. ...................................... 91/369.2; 91/369.3
(58) Field of Search .............................. 91/369.2, 369.3, 91/376 R

(56) References Cited

U.S. PATENT DOCUMENTS 6,186,042 B1 * 2/2001 Levrai et al. .............. 91/369.2
6,408,738 B1 * 6/2002 Harth et al. ............... 91/369.2

FOREIGN PATENT DOCUMENTS

WO WO 00/13953 * 3/2000 .......... B60T/13/57

* cited by examiner

Primary Examiner—Edward K. Look
Assistant Examiner—Michael Leslie
(74) Attorney, Agent, or Firm—Leo H McCormick, Jr.; Warren Comstock

(57) ABSTRACT

A braking servomotor (10) having a rigid casing (12) with a movable wall (14) location therein to define a front chamber (16) and a rear chamber (18). The movable wall (14) carries a piston (22) that slidably receives an actuating rod (28) for a master cylinder (36). A control rod (28) is sliding located in a bore inside a piston (22) and moved as a function of an input force. The control rod (28) has an end that bears against a plunger (46) that has a finger (52) that biases a reaction disk (32) located at the rear surface of the actuating rod (28) to transmit a reaction force from the actuating rod through the plunger to the control rod. The servomotor (10) is characterised by a unidirectional clutch device (56) that responds to a predetermined speed at which an input force is applied to the control rod (28) to lock the actuating rod in relation to the piston (22), independently, of the reaction disk (32), the plunger (22) and the control rod (28).

12 Claims, 7 Drawing Sheets

SERVOMOTOR WITH A DEFORMABLE-ADJUSTABLE SLEEVE

This invention relates to a pneumatic servomotor used for assisting in the braking of a motor vehicle.

BACKGROUND OF THE INVENTION

More particularly, the present invention relates to a pneumatic servomotor for an assisted braking of a motor vehicle, of the type comprising a rigid casing, in which a transverse partition wall is movable, thus defining in an airtight manner a front chamber under a first engine negative pressure, and a rear chamber under a second pressure, varying between the engine negative pressure and the atmospheric pressure; of the type including a moving piston, integral with the moving partition wall and capable of biasing a rear end of an actuating rod for a brake master cylinder, said actuating rod being slidably arranged in relation to the moving piston, against a first return spring mounted inside the front chamber; and of the type including a control rod, moving inside the piston, in a selective manner as a function of an axial input force, exerted in the forward direction against a return force applied to the rod by a second return spring; of the type according to which the control rod is biased towards either an intermediate actuation position or an end actuation position, resulting from the applying of the input force at a determined high speed; of the type comprising a plunger, arranged at the front part of the control rod inside the piston, and a three-way valve, including at least an annular seat borne by a rear section of the plunger, and capable of varying the second pressure, prevailing within the rear chamber, particularly by connecting the front chamber with the rear chamber when the control rod is in the rest position, or by gradually connecting the rear chamber with the atmospheric pressure when the control rod is actuated; and of the type in which, in the end actuation position of the control rod, a finger-forming front end of the plunger biases a reaction disk integral with the rear end of the actuating rod, so as to transmit the reaction force of the actuating rod to the plunger and to the control rod.

Numerous examples of such pneumatic servomotors are known, for instance as disclosed in documents U.S. Pat. No. 3,470,697, FR-A-2 532 084 and FR-A-2 658 466.

It has been established that quite a number of drivers, when confronted with a braking situation requiring the jamming on of the brakes, would suddenly apply the brakes but afterwards, underestimating the risks actually incurred, would somewhat release the braking force at the very time when a high braking force should have been maintained in order to avoid an accident.

As a matter of fact, in the case of a full-braking situation, in which a maximum braking force is applied on the control rod, the actuation of the control rod causes the finger-forming plunger to be actuated, which fact results in the maximum opening of the three-way valve and, therefore, the rear chamber is subjected to the atmospheric pressure. Thus, the moving partition wall travels forward and the end of the plunger contacts the reaction disk, integral with the rear face of the moving piston.

Therefore, the force, which is applied onto the moving piston when the control rod reaches the end of its stroke, results from the assisting force, arising from the pressure difference between each side of the moving partition wall, and from the force exerted by the finger-forming plunger onto said moving piston. Besides, the driver feels the braking reaction force, which is transmitted from the moving piston to the plunger, through the reaction disk.

Now, in the case of a full-braking situation, accompanied by the swift travel of the control rod, the plunger may touch the reaction disk and therefore give the driver the feeling of a maximum braking action even before the pressure difference between the front and rear chambers actually reaches its maximum value, which may lead the driver to release the braking force even though it should be maintained so as to profit by the maximum braking force.

In order to cope with said difficulty, it is a well-known practice to provide a pneumatic servomotor comprising a finger, which is slidably mounted in relation to the plunger, and a unidirectional clutch device permitting, when the braking force is applied at a determined speed, the indirect locking of the actuating rod, through the locking of the finger relative to the moving piston, independently of the plunger position.

Such a servomotor is described, more particularly, in document WO-A-99/59 854. This document discloses and illustrates a servomotor, comprising a finger, slidably fitted at the front end of the plunger and capable of being locked in relation to the moving piston by means of a detent controlled by a key, which is displaceable between a rest position, in which it bears on the casing of the servomotor, and a rocked position, in which it no longer bears on the casing of the servomotor but in which it actuates the detent, cooperating with a flange of the finger.

A servomotor of the previously-described type makes it possible to cope with said difficulty, in that the plunger is locked into contact with the reaction disk by means of a sleeve, as a consequence of which a maximum force is maintained on the rear face of the moving piston, even though the driver may have released the braking force in part.

Other devices are known from the state of the art but all of them have the same disadvantage, unlike a servomotor without a unidirectional clutch device, of requiring, as it is manufactured, the separate machining of a sleeve and of a finger. Such design means a considerable increase in the manufacturing cost of said servomotor.

Besides, the locking of the actuating rod can be achieved in an indirect manner only, by the locking of the finger, i.e. through the reaction disk, made of an elastomeric material. Therefore, the accurate locked position of the actuating rod depends on the volume variations of the reaction disk, owing to the reaction force applied to the actuating rod by the brake master cylinder, which it controls.

In order to cope with such a disadvantage, the present invention provides a novel design of a servomotor, comprising a unidirectional clutch device including a finger, integral with the plunger, and in which the locking of the actuating rod relative to the moving piston is directly achieved, i.e. independently of the reaction disk.

SUMMARY OF THE INVENTION

Therefore, it is the object of the present invention to provide a servomotor of the above-described type, characterised in that it comprises a unidirectional clutch device which, when the input force is applied at the determined speed, is capable of taking up an active position, in which it locks the actuating rod in relation to the moving piston in an end front axial position, in which the reaction force is transmitted to the moving piston, independently of the reaction disk and independently of the position of the plunger and of that of the control rod.

According to other features of this invention:

the unidirectional clutch device comprises expandable means for an axial insertion, in the active position, between the moving piston and the rear end of the actuating rod, so as to lock the latter into its end front axial position;

the plunger has a finger-forming front free end section, which is slidably fitted within a complementary front bore of the piston;

the front bore of the piston opens into a cup, integral with the rear end of the actuating rod, said cup being slidably mounted on a cylindrical bearing surface of the piston, and receiving the reaction disk;

a rear pawl of the actuating rod extends axially rearwards from the bottom rear face of the cup, passes through the reaction disk and is accommodated, with an axial clearance, within a blind axial hole provided in the plunger, so as to let the plunger, when the input force is exerted at a determined high speed, bias directly the actuating rod towards its front end position;

the expandable means of the unidirectional clutch device comprise several balls at regular angular spacing about the cylindrical bearing surface of the moving piston, and fitted so as to be movable between a radial position away from the axis of the moving piston, and corresponding to an inactive position of the unidirectional clutch device, and a radial position, which is closer to the axis of the moving piston and which corresponds to the active position of the unidirectional clutch device, and in which they are capable of coming axially between a rear end face of the cup and a front face of the moving piston, so as to lock the actuating rod in its end front axial position in relation to the moving piston;

the rear pawl of the actuating rod is mounted with a given clearance relative to a bottom of the blind hole provided in the plunger, in such a way that, when the input force is exerted at a determined speed, the plunger pushes the cup in the forward direction by a determined distance, for the balls to come axially into contact with the cylindrical bearing surface of the moving piston, between the rear end face of the cup and the front face of the moving piston;

the rear end face of the cup exhibits a bevel with the purpose of:
  providing a support for the balls, in the inactive position of the unidirectional clutch device; and
  guiding the balls into contact with the cylindrical bearing surface of the moving piston, in the active position of the unidirectional clutch device;

the expandable means comprise a tubular sleeve, slidably fitted about the cylindrical bearing surface, in a coaxial bore provided in the moving piston, said sleeve being resiliently biased rearwards and having a rear inner bevel, substantially at right angles with the balls and the purpose of which consists in:
  maintaining the balls in their remote radial position, resting on the bevel-forming rear end face of the cup, and on a supporting washer contacting the front face of the moving piston, in the inactive position of the unidirectional clutch device;and
  biasing the balls towards their closer radial position, so that they may come between the bevel-forming rear end face of the cup and the washer, into contact with the cylindrical bearing surface of the piston, in the active position of the unidirectional clutch device;

the expandable means Of the unidirectional clutch device comprise at least one ring, made of an elastomeric material and glued about the cylindrical bearing surface of the moving piston and about the cup, said ring being deformable between an expanded radial position, corresponding to an inactive position of the unidirectional clutch device, and a compressed radial position, which corresponds to the active position of the unidirectional clutch device and in which it can lock the cup in an advanced position, so as to put the actuating rod in its end front axial position in relation to the moving piston;

the rear pawl of the actuating rod is mounted with a determined clearance relative to a bottom of the blind hole made in the plunger so that, when the input force is applied at a determined high speed, the plunger pushes the cup in the forward direction by a determined distance, with the result that a given space is made available for an immediate occupying by the elastomeric ring, the latter being radially biased into compression by a rear inner bevel in a tubular sleeve, slidably mounted and resiliently returned about the cylindrical bearing surface of the moving piston, in a coaxial bore provided in the moving piston;

the unidirectional clutch device comprises means for the forward driving of the tubular sleeve, against its return means, when the input force is released so as to release the unidirectional clutch device as well; and the moving piston includes a substantially radially directed cavity which receives a key, slidingly fitted on the plunger and comprising two opposite branches protruding out of the cavity and capable of abutting against the respective walls of the casing, when the control rod is in the rest position, with the result that a front face of one of the branches biases a slide forwards, said slide being slidingly fitted inside a bore provided in the moving piston and opening facing a rear edge of the sleeve in such a manner that, when the input force is released, the tubular sleeve is driven forwards again, against its return means.

Other features and advantages of the present invention will be apparent from the following detailed description, when taken in conjunction with the accompanying drawings.

DETAILED DESCRIPTION OF THE INVENTION

Figure 1:
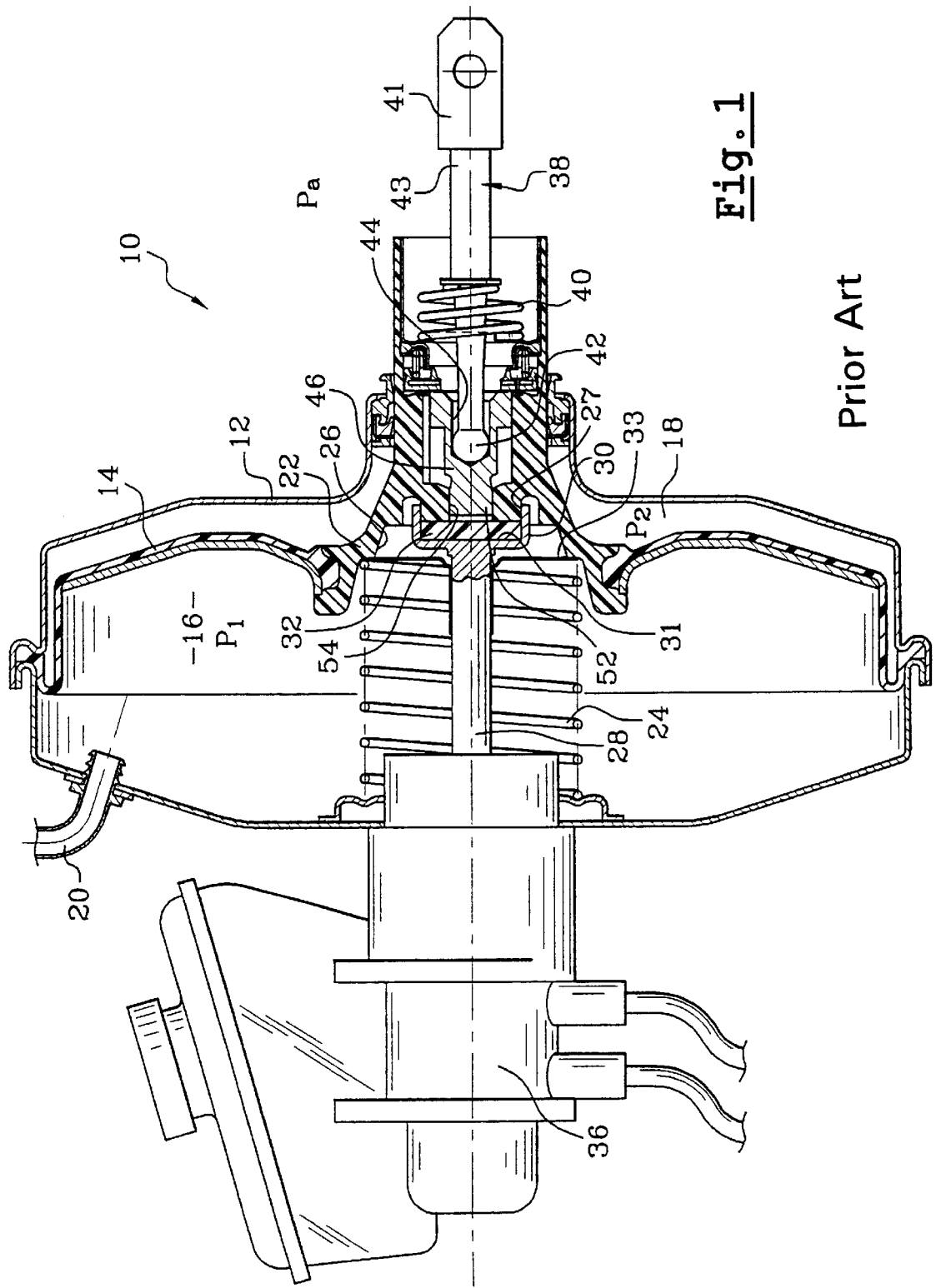
FIG. 1 is an overall axial sectional view, showing a pneumatic servomotor for an assisted braking according to the prior art.

In the following description, the same reference numerals will designate the same elements, or elements having similar functions.

As a rule, the terms "front", "rear", "upper" and "lower" refer respectively to elements or positions facing leftward, rightward, upward or downward in the figures.

FIG. 1 illustrates a conventional pneumatic servomotor 10 for an assisted braking of a motor vehicle.

In a well-known manner, the pneumatic servomotor 10 comprises a substantially cylindrical rigid casing 12, in which a transverse partition wall 14 is movably mounted, so as to define therein, in an airtight manner, a front chamber 16 under a first pressure "$P_1$", the value of which is equal to the negative pressure value of the vehicle engine, and a rear chamber 18 under a second pressure "$P_2$". Said second pressure "$P_2$" may vary between the engine negative pressure value "$P_1$" and the atmospheric pressure "$P_a$", as will be further explained hereunder.

The front chamber 16 is supplied with the pressure "$P_1$" through a negative-pressure pipe 20, connected to a vacuum source of the vehicle, for instance a negative pressure prevailing in an inlet manifold (not shown) of a vehicle engine.

The pneumatic servomotor 10 comprises a moving piston 22, integral with the moving partition wall 14. The front face 26 of the moving piston 22 has a cylindrical bearing surface 27, which slidingly receives a cup 30, the front face 34 of which is integral with the rear end of an actuating rod 28 of a hydraulic-brake master cylinder 36 of the vehicle. The cup 30, the so-called "reaction cup", accommodates in its concave part, that is between its bottom rear face 31 and the front face 26 of the moving piston, a reaction disk 32, made of an elastomeric material and to be described here below. Therefore, the moving piston 22 is capable of biasing the actuating rod 28, against a return spring 24, arranged between the casing 12 and a supporting plate 33 integral with the front face 26 of the moving piston 22.

A control rod 38, e.g. connected to the brake pedal of the vehicle through a coupling sleeve 41, arranged at its free rear end 43, may selectively travel within the moving piston 22, as a function of an input axial force, applied to the control rod 38 in the forward direction. The actuation force is exerted against a return force, applied to the rod 38 by a return spring 40, arranged between the moving piston 22 and the control rod 38.

The front end 42 of the control rod 38 is shaped into a toggle, received in a housing 44 having a complementary shape and provided in a substantially cylindrical plunger 46, which is slidably mounted in the moving piston 22.

As shown in FIGS. 2 through 7, a rear annular seat 48 of the plunger 46 belongs to a three-way valve 50, capable of varying the second pressure "$P_2$", prevailing in the rear chamber 18, more particularly by connecting the front chamber 16 with the rear chamber 18 when the control rod 38 is in the rest position, or by gradually subjecting the rear chamber 18 to the atmospheric pressure "$P_a$" when the control rod 38 is actuated.

Since the mode of operation of the three-way valve 50 is known from the state of the art, it will not be further described herein.

In a well-known manner, a finger-forming front free end section 52 of the plunger 46 is slidably fitted inside a complementary bore 54 provided in the moving piston 22 and opening into the concave part of the reaction cup 30.

Therefore, the finger 52 is capable of being biased by the plunger 46 so as to bias, in turn, the reaction disk 32 and compress it, and thus the reaction force of the moving piston 22 is transferred onto the plunger 46 and, in consequence, onto the control rod 38, in an end-of-stroke actuation position of the control rod 38.

Under the circumstances, an actuating force, transmitted to the control rod 38 at a reduced speed, causes the three-way valve 50 to open, which means that the rear chamber 18 is gradually subjected to the atmospheric pressure "$P_a$". So, both the moving piston 22 and the finger travel at the same speed up to the end of the stroke of the control rod 38.

When the control rod 38 reaches the end of its stroke, the finger 52 contacts the reaction disk 32, which is able thereby to transmit the reaction force from the moving piston 22 to the plunger and the control rod 38.

When an actuating force is transmitted to the control rod 38 at a determined speed, the opening of the three-way valve 50 does not allow the atmospheric pressure "$P_a$" to be established fast enough in the rear chamber 18 for the moving piston 22 to travel together with the plunger 46. It results in that the finger 52 of the plunger 46 comes into contact with the reaction disk 32 before the moving piston 22 actually gives the actuating rod 28 a maximum assisting force, which fact may induce the vehicle driver to think a maximum braking force is at his disposal, whereas this is not the case yet. And therefore he may be led to release the exerted braking force, even though the maximum braking force has not been applied to the actuating rod 28 so far.

Therefore, in order to cope with such a disadvantage, the present invention provides a novel design of the servomotor 10, in which a unidirectional clutch device 56, when the input force is applied at the determined speed, is capable of taking up an active position, in which it locks the actuating rod 28 in relation to the moving piston 22 in an end front axial position, in which the reaction force is transmitted to the moving piston 22, independently of the reaction disk 32 and independently of the position of the plunger 46 and of that of the control rod 38.

As shown in FIGS. 2 through 7, the unidirectional clutch device 56 comprises expandable means for an axial insertion, in the active position, between the moving piston 22 and the rear end of the actuating rod 28, so as to lock the latter into its end front axial position.

For this purpose, in order to enable the expandable means to come axially between the moving piston 22 and the rear end of the actuating rod 28, a rear pawl 58 of the actuating rod 28 extends axially rearwards from the bottom rear face 31 of the cup 30 and passes through the reaction disk 32. In the rest position of the servomotor, illustrated in FIGS. 2 and 5, the rear pawl 58 is accommodated within a blind axial hole 60 provided in the plunger, with an axial clearance "J" relative to the bottom 66 of the blind axial hole 60 so as to let the plunger 46, when the input force is exerted at a determined high speed, bias directly the actuating rod 28 towards its front end position, while bearing on the rear free end of the pawl 58.

As a matter of fact, in general, when the input force is applied at the determined speed, the plunger 46 is likely to travel in the forward direction at a higher speed than that of the moving piston 22 and, as a consequence, higher than that of the actuating rod 28 too. So, when the plunger reaches its end-of stroke position at the determined speed, it may move forward by a distance which is greater than the clearance "J", which enables it to bias the pawl 58 and consequently the cup 30 so that the latter travels forward in relation to the moving piston by a distance allowing the unidirectional clutch device 56 to be intercalated.

The detailed first embodiment of the unidirectional clutch device 56 will be explained with reference to FIGS. 2 through 4.

Figure 2:
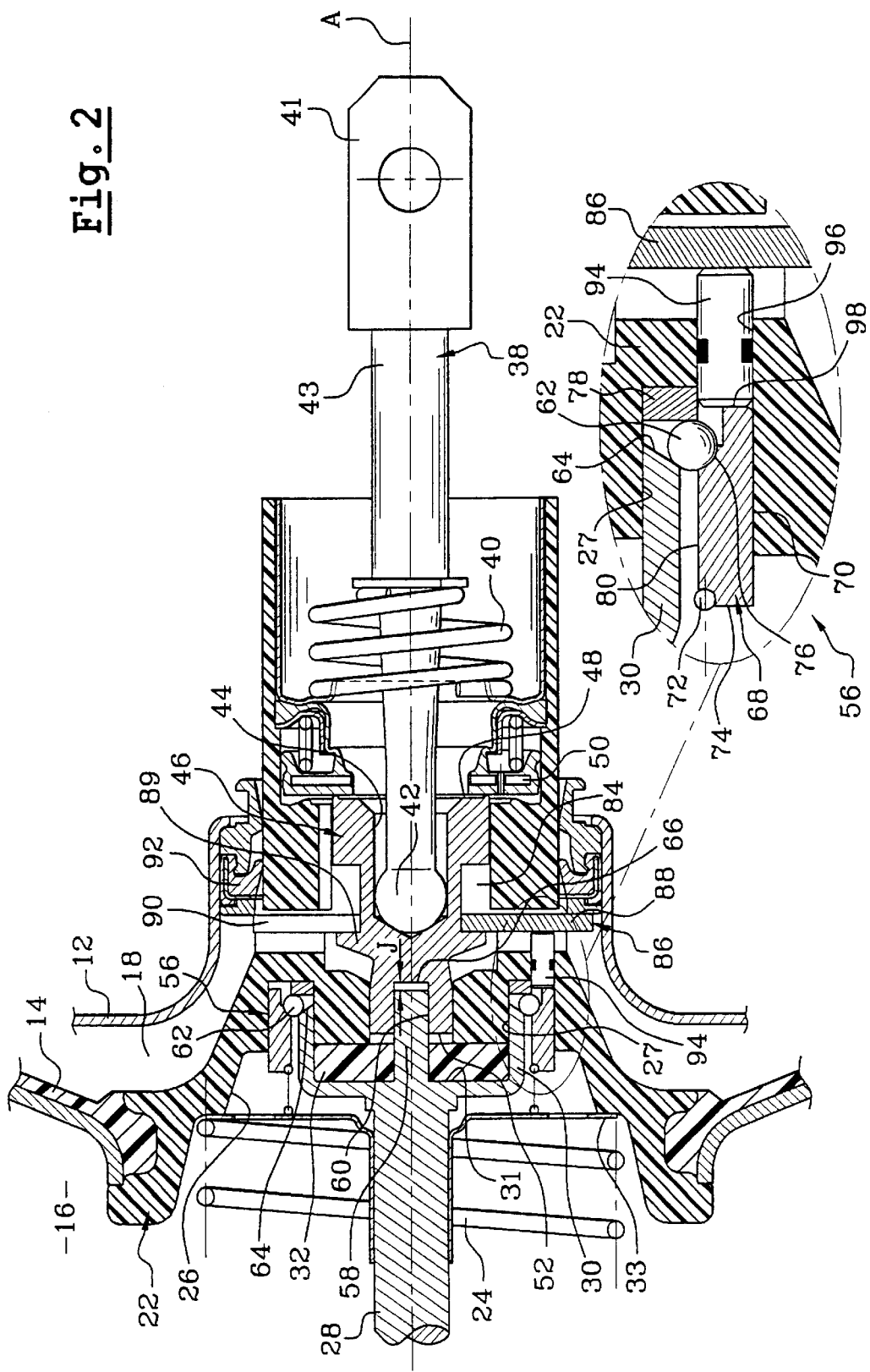
FIGS. 2 through 4 are detail axial sectional views, showing a pneumatic servomotor for an assisted braking according to a first embodiment of the present invention, and represented in the rest position, in the assisting position and in the locking position respectively.
Figure 3:
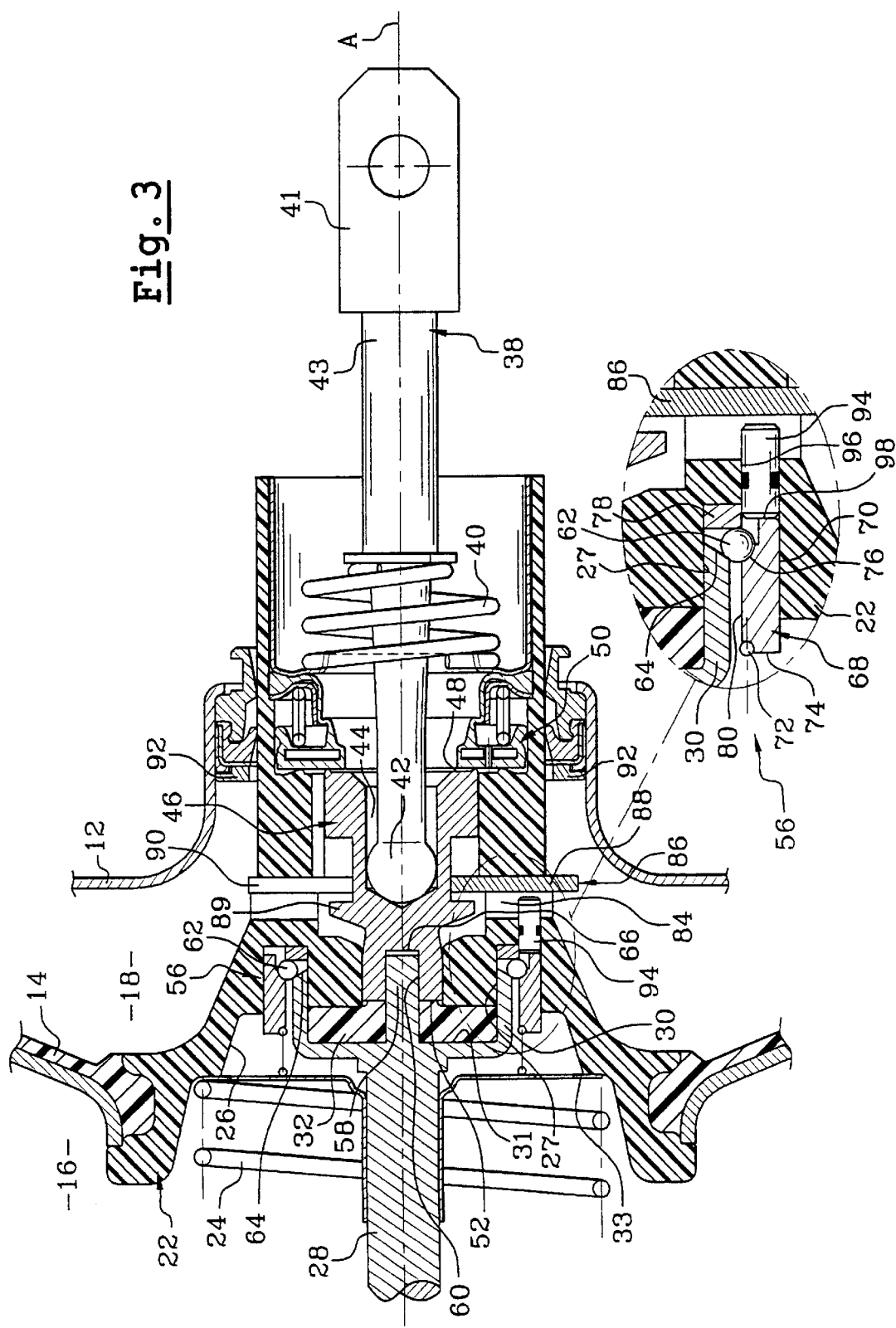
Figure 4:
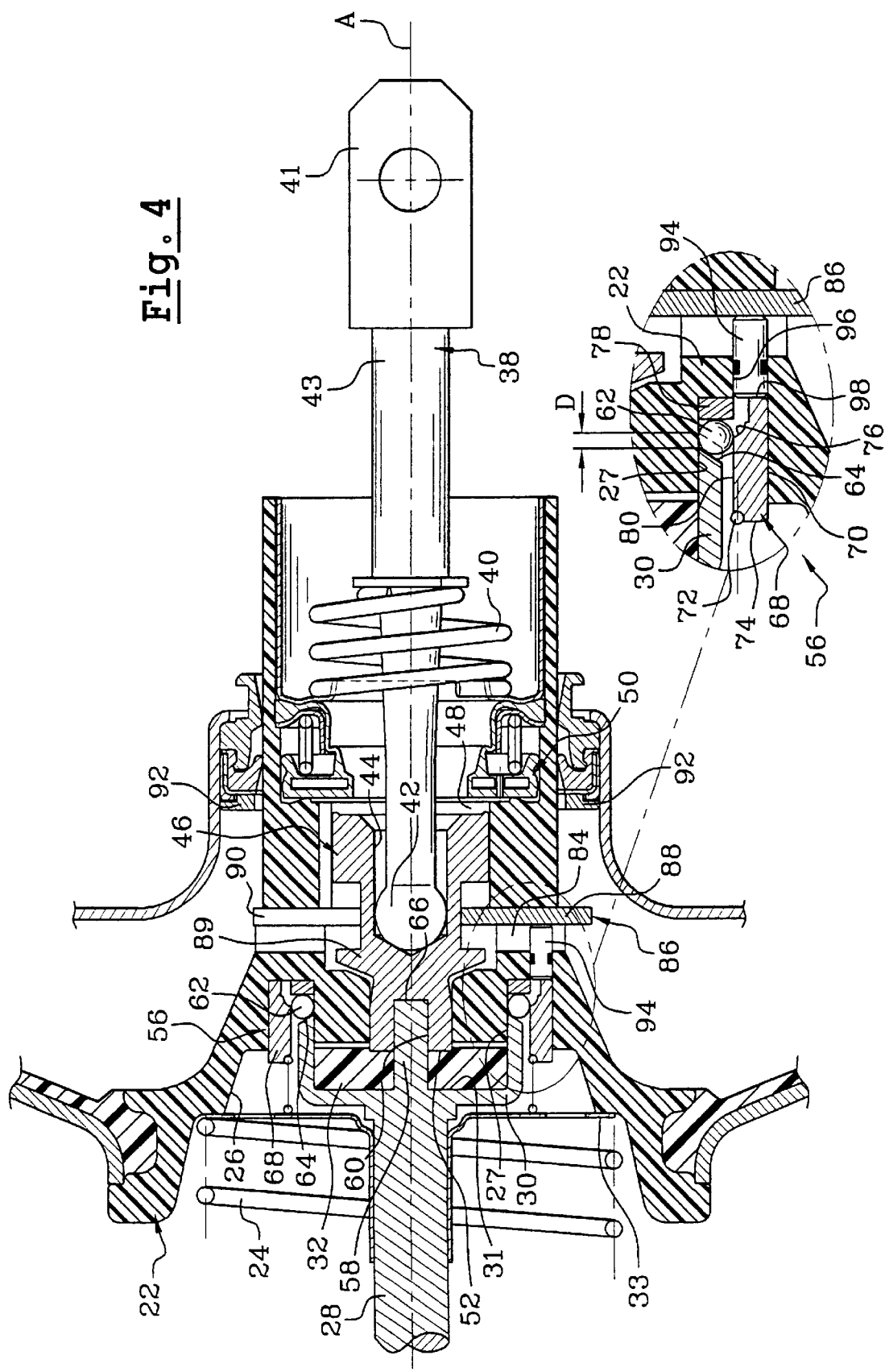

In this first embodiment according to the invention, the expandable means of the unidirectional clutch device 56 comprise several balls 62 at regular angular spacing about the cylindrical bearing surface 27 of the moving piston 22, and fitted so as to be movable between a radial position away from the axis A of the moving piston 22, as shown in FIGS. 2 and 3 (corresponding to an inactive position of the unidirectional clutch device 56), and a radial position, which is closer to the axis A of the moving piston 22, as illustrated in FIG. 4 (which corresponds to the active position of the unidirectional clutch device 56), and in which the balls 62 are capable of coming axially between a rear end face 64 of the cup 30 and the front face 26 of the moving piston 22, so as to lock the actuating rod 28 in its end front axial position in relation to the moving piston 22.

More especially, the rear pawl 58 of the actuating rod 28 is fitted with the determined clearance "J" relative to the bottom 66 of the blind hole 60 in the plunger 46, as shown in FIG. 2 which represents the servomotor 10 in its rest position.

When the control rod 38 is actuated at a reduced speed, i.e. in the case of a conventional assisting operation, shown in FIG. 3, the piston 22 travels forwards substantially at the same speed as the plunger 46 and therefore the bottom 66 of the blind hole, provided in the plunger 46, does not contact the pawl 58.

But when the input force is applied at a determined speed, as illustrated in FIG. 4, the plunger 46 covers a greater distance than the clearance "J" and the bottom 66 of the blind hole 60 provided in the plunger 46 comes into contact with the pawl 58 and pushes it in the forward direction, said pawl 58 pushing, in turn, the cup 30 forwards by a determined distance "D" relative to its initial position, indicated by dotted lines. The forward motion of the cup 30 enables the balls 62 to come axially into contact with the cylindrical bearing surface 27 of the moving piston 22, between the rear end face 64 of the cup and the front face 26 of the moving piston 22.

In this configuration, even if the driver does not exert a maximum force on the control rod 38, the actuating rod 28 remains locked in its end front position by means of the balls 62. In an advantageous manner, such configuration ensures the maintaining of a maximum force on the actuating rod 28.

In the preferred embodiment of the invention, the rear end of the cup 30 exhibits a bevel constituting its rear end face 64.

On the one hand, the bevelled rear end face 64 is intended to provide a supporting surface for the balls 62 in the inactive position of the unidirectional clutch device 56, as represented in FIGS. 2 and 3.

On the other hand, the bevelled rear end face 64 will guide the balls 62 in the course of their radial motions.

As a matter of fact, when the unidirectional clutch device 56 changes from its inactive position to its active one, that is from a configuration as shown in FIG. 2 or 3 to the configuration illustrated in FIG. 4, the bevelled rear end face 64 acts like a ramp so as to guide the balls 62 into contact with the cylindrical bearing surface of the moving piston.

Conversely, when the driver releases the force exerted on the control rod 38 to a substantial extent, thus causing the three-way valve 50 to open and consequently the return motion of the moving piston 22 and of the cup 30, the unidirectional clutch device 56 changes from its active position to its inactive position, i.e. from the configuration of FIG. 4 to that of FIG. 2. The bevelled rear end face 64 acts like a ramp so as to move the balls 62 away from the cylindrical bearing surface of the moving piston.

Advantageously, for an easier guiding of the balls 62, the expandable means comprise a tubular sleeve 68, slidably fitted about the cylindrical bearing surface 27, in a bore 70 provided in the moving piston 22 coaxial with the cylindrical bearing surface 27, and a supporting washer 78, arranged at the bottom of the bore 70 against the front face 26 of the moving piston 22.

The tubular sleeve 68 is resiliently biased rearwards by a return spring 72, accommodated between the rear face of the supporting plate 33 and a front face 74 of the sleeve, so as to be always in contact with the balls 62, whatever the position of the unidirectional clutch device 56 may be. The sleeve 68 has a rear inner bevel 76, substantially at right angles with the balls 62.

In the inactive position of the unidirectional clutch device 56, as shown in FIGS. 2 and 3, the sleeve 68 will maintain the balls 62 in their remote radial position, simultaneously resting on the bevel-forming rear face 64 of the cup 30 and on the supporting washer 78 at the front face of the moving piston 22.

When the unidirectional clutch device 56 changes from its inactive position, illustrated in FIGS. 2 or 3, to its active position, as shown in FIG. 4, the sleeve 68 biases the balls, through its inner bevel 76, towards their closer radial position, so that they may come between the bevel-forming rear face 64 of the cup 30 and the supporting washer 78, into contact with the cylindrical bearing surface 27 of the moving piston. Then an inner bore 80 in the sleeve 68 retains the balls 62 in contact with the cylindrical bearing surface 27 of the moving piston, as shown in FIG. 4.

It will be obvious that the bore 80 is located at a radial distance from the cylindrical bearing surface 27 of the moving piston, said distance substantially equals the diameter of a ball 62.

Conversely, when the unidirectional clutch device 56 changes again from its active position to its inactive one, the sleeve 68 is capable of retracting in the forward direction, as will be further described here below, thus enabling the balls 62 to resume their position, radially away from the axis A of the moving piston 22.

A second embodiment of the unidirectional clutch device 56 will now be described more circumstantially with reference to FIGS. 5 to 7.

Figure 5:
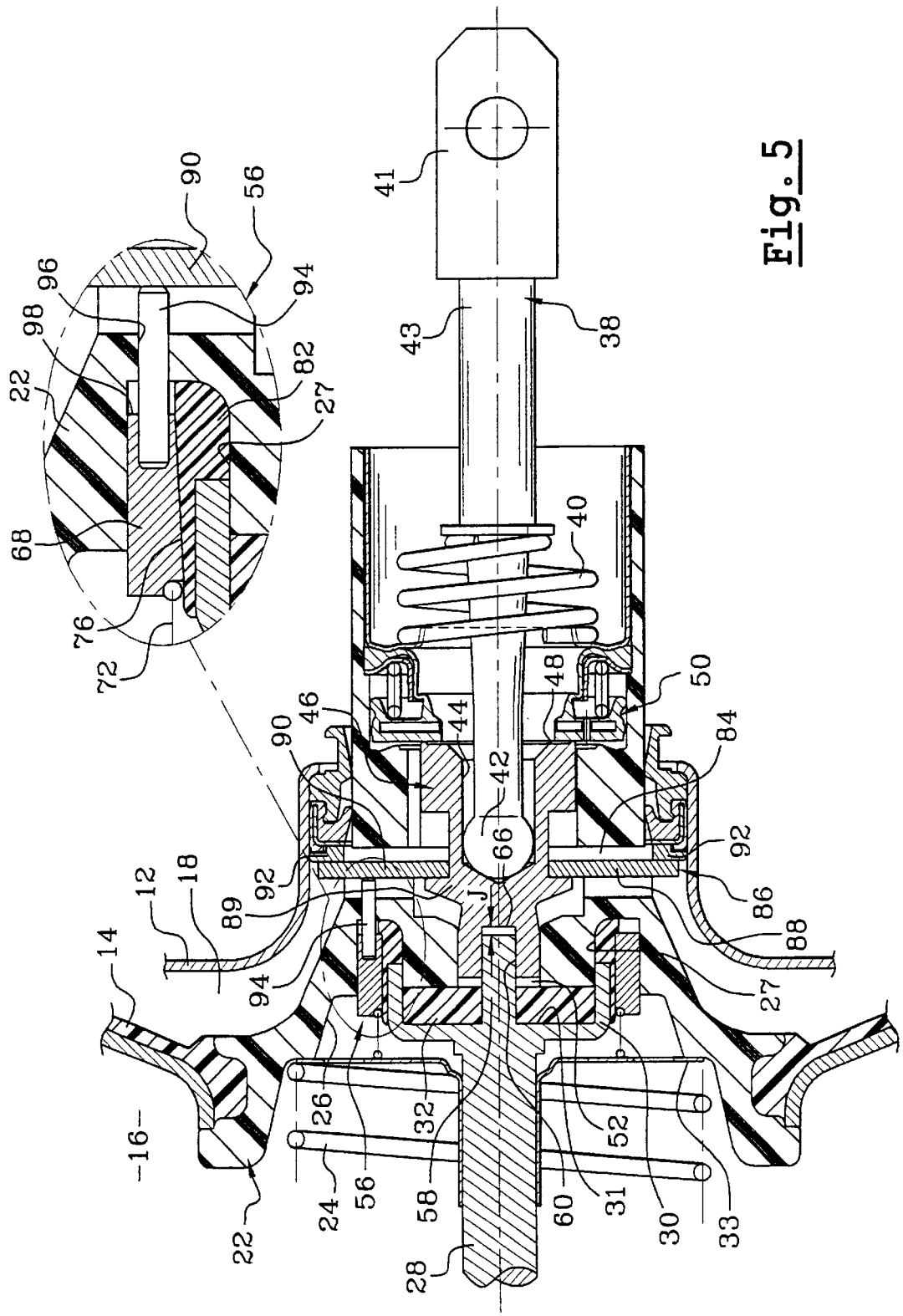
FIGS. 5 though 7 are detail axial sectional views, showing a pneumatic servomotor for an assisted braking according to a second embodiment of the present invention, and represented in the rest position, in the assisting position and in the locking position respectively.
Figure 6:
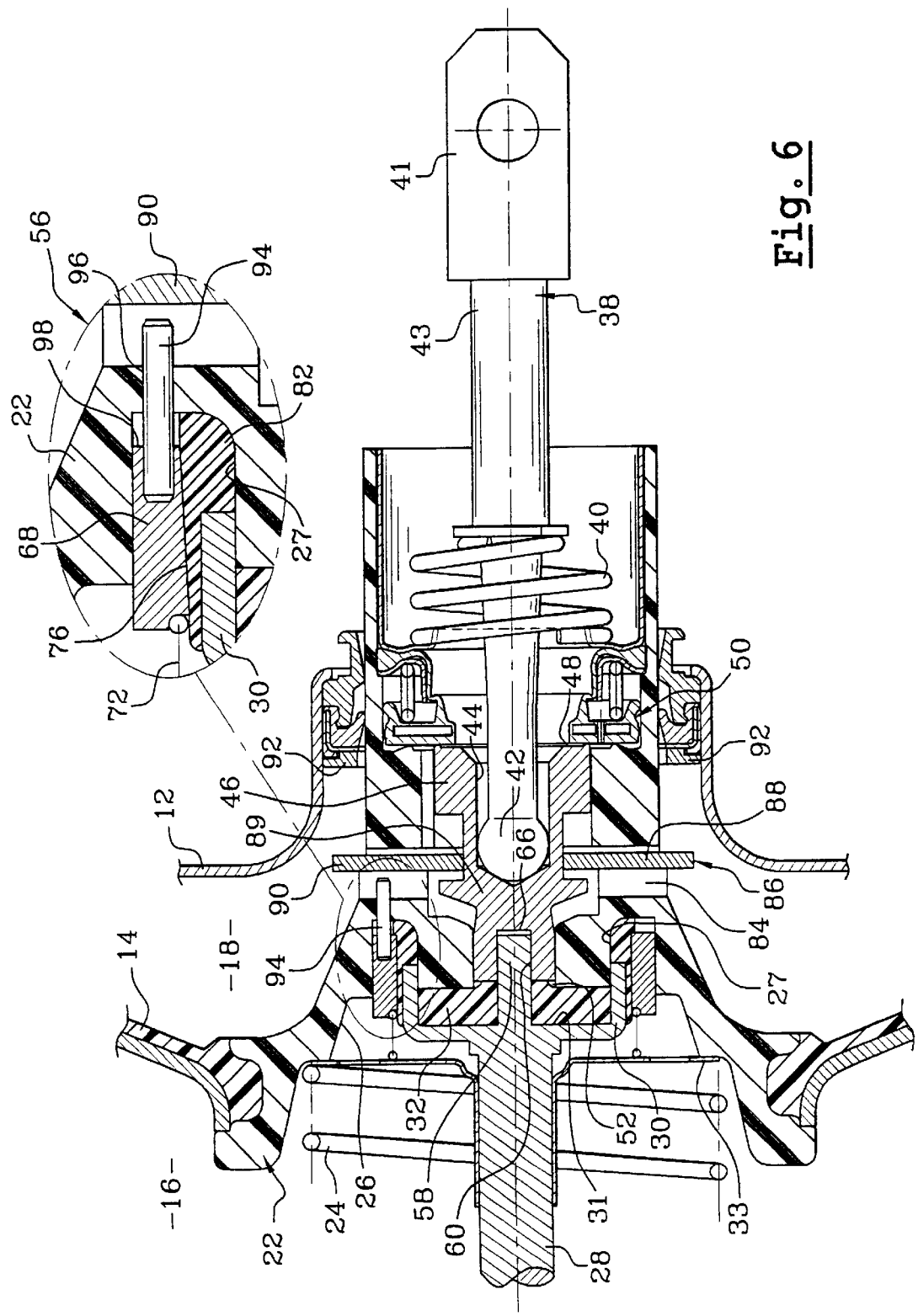
Figure 7:
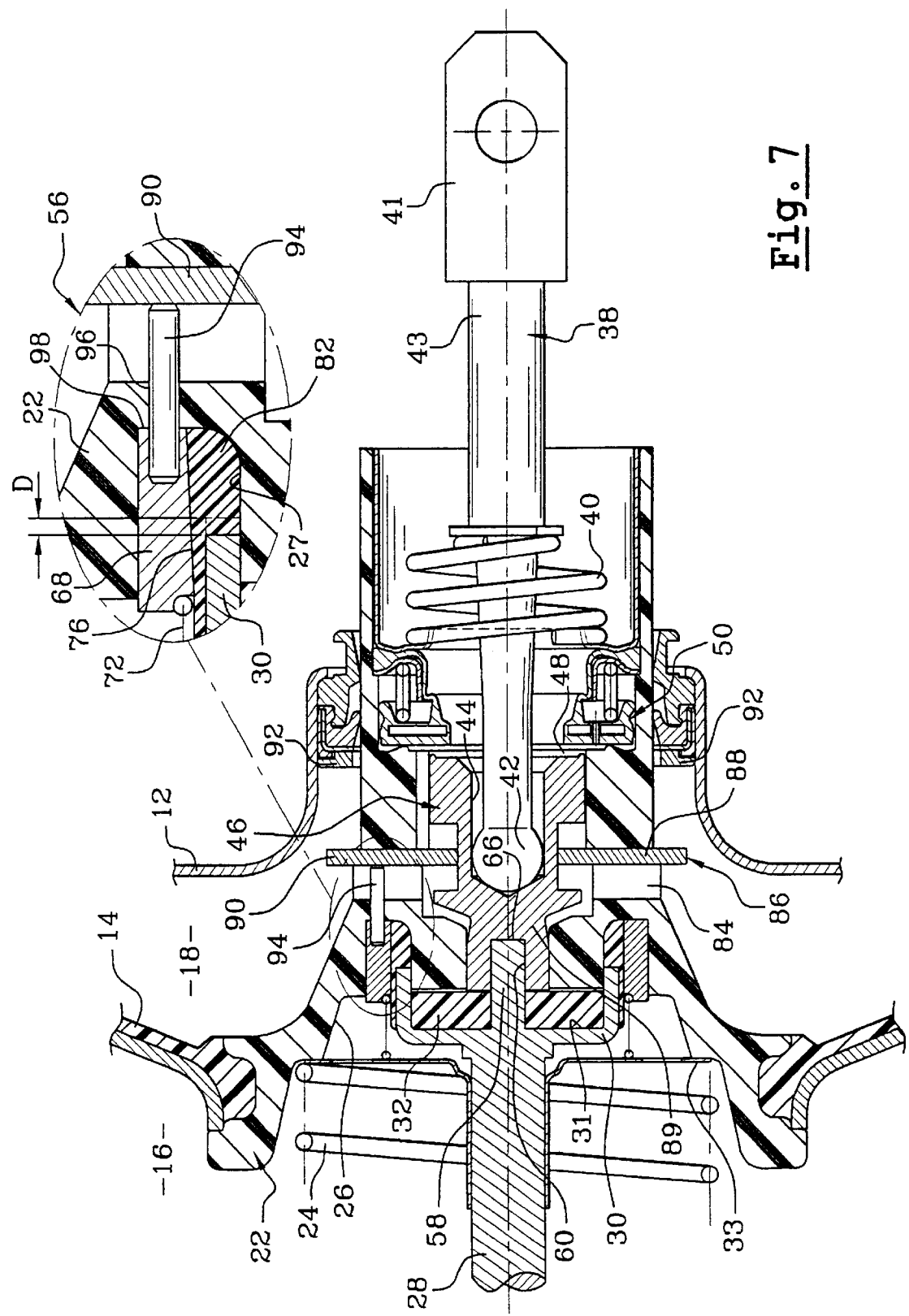

In this second embodiment, the expandable means of the unidirectional clutch device 56 comprise at least one ring 82, made of an elastomeric material and glued about the cylindrical bearing surface 27 of the moving piston 22 and about the cup 30, said ring being deformable between an expanded radial position, corresponding to an inactive position of the unidirectional clutch device 56, as illustrated in FIGS. 5 and 6, and a compressed radial position as in FIG. 7, which corresponds to the active position of the unidirectional clutch device 56, and in which it can lock the cup 30 in an advanced position, so as to put the actuating rod 28 in its end front axial position in relation to the moving piston 22.

Similarly to the first embodiment, the rear pawl of the actuating rod is accommodated, with the determined clearance "J" relative to the bottom of the blind hole 60 provided in the plunger 46, in such a way that, when the input force is exerted at a determined high speed, the plunger 46 pushes the cup 30 in the forward direction by a determined distance "D", as represented in FIG. 7. The forward travel of the cup 30 leaves some room for an immediate occupying by the elastomeric ring 82.

As a matter of fact, the ring 82 is designed to be compressively radially biased by the rear inner bevel 76 of a tubular sleeve 68, substantially similar to that of the first embodiment, the rear bevel 76 allowing the radial compression of the elastomeric material of the ring 82, in its radially farthest part in relation to the cylindrical bearing surface 27, in such a manner that its radially nearest part relative to the cylindrical bearing surface 27 biases the cup 30 axially.

In particular, the tubular sleeve 68 is slidably fitted in the coaxial bore 70 provided in the moving piston 22 and it is resiliently biased rearwards about the cylindrical bearing surface 27 of the moving piston 22, by a return spring 72 similar to that described with reference to the first embodiment.

When the ring 82 is compressed, the elastomeric material constituting it is subjected to a pressure which is high enough for the ring 82 to behave like an incompressible rigid body, thus prohibiting any rearward motion of the cup 30 and therefore of the actuating rod 28.

Moreover, in both embodiments according to this invention, the unidirectional clutch device 56 comprises means designed to bring the tubular sleeve 68 back again in the forward direction, against its return spring 72, when the input force is released, so as to release the unidirectional clutch device 56 as well.

With this object in view, the moving piston 22 includes a substantially radially directed cavity 84 that receives a key 86, slidingly fitted on the plunger 46. The key 86 comprises two opposite branches 88, 90 protruding out of the cavity 84. A slide 94 is slidingly fitted inside a bore 96 opening facing a rear edge 98 of the sleeve 68 and facing one of the branches 88, 90.

In the first embodiment shown in FIGS. 2 through 4, the slide 94 is freely received in the bore 96. In the second embodiment, illustrated in FIGS. 5 through 7, as an alternative, the front end of the slide 94 may be arranged to be integral with the rear part of the sleeve 68.

When the control rod 38 is in the rest position, the moving piston 22 being at rest too as a consequence of it, a flange 89 of the plunger 46, arranged forwardly of the key 86, is capable of biasing the key 86 and thus the opposite branches 88, 90 into abutment against the respective walls 92 of the casing 12, situated forwardly of the position actually occupied by the rear edge of the cavity 84. Therefore, the key 86 does not bear on the rear edge of the cavity.

In both embodiments, the slide 94 has a given length resulting in that, when the servomotor 10 is in the rest position, and thus when the moving piston 22 is in the rear rest position, the slide 94 bears on one of the branches 88, 90. Therefore the sleeve 68 is slightly pushed back forwards, which gives the expandable means full freedom of motion.

In the assisting intermediate position, since the key does not bear any more on the walls 92 of the casing, and since it is in contact again with the wall 96, owing to the forward travel of the moving piston 22, the slide is no longer in contact either with the branch 88 or the branch 90 and consequently the sleeve 68 exerts on the expandable means a rearward axial force, enabling the expandable means to come between the moving piston 22 and the cup 30, once the latter has been pushed back by the pawl 58.

Conversely, when the assisting force is released and when the moving piston 22 and the plunger 46 resume together their rear rest positions, the key 86 is returned into abutment against the walls 92 of the casing by the flange 89 of the plunger, and the slide 94 comes into contact with one of the branches 88, 90 of the key 86, exerting on said slide a forward axial force. Said axial force is transmitted to the sleeve 68, against its return spring 72, which makes the sleeve 68 move forwards and release the expandable means.

Therefore, in an advantageous manner, the present invention gives the benefit of a maximum braking force in emergency braking situations, whatever the driver's behaviour may be following the jamming on of the brakes.

I claim:

1. A pneumatic servomotor for an assisted braking of a motor vehicle, said servomotor having a rigid casing with a movable transverse partition wall therein that defines in an airtight manner a front chamber under a first engine negative pressure and a rear chamber under a second pressure, said second pressure varying between said first pressure and atmospheric pressure; said movable wall including an integral piston that biases a rear end of an actuating rod for a brake master cylinder, said actuating rod being slidably arranged in relation to said piston against a first return spring mounted inside said front chamber; and a control rod that moves inside of said piston in a selective manner as a function of an axial input force exerted in the forward direction against a return force applied to said control rod by a second return spring; said control rod being biased towards either an intermediate actuation position or an end actuation position resulting from the applying of said input force at a predetermined high speed; a plunger, arranged at a front part of said control rod inside of said piston, and a three-way valve, including at least an annular seat borne by a rear section of said plunger, and said three-way valve varying the second pressure prevailing within said rear chamber particularly by connecting said front chamber with said rear chamber when said control rod is in a rest position and by gradually connecting said rear chamber with atmospheric pressure when said control rod is actuated by an input force; said plunger having a finger-forming front end that biases a reaction disk integral with a rear end of said actuating rod in an end actuation position for said control rod to transmit the reaction force from said actuating rod through said plunger into said control rod; characterised in that said piston has a front bore that opens into a cup that is integral with a rear end of said actuating rod, said cup receiving said reaction disk with said cup being slidably mounted on a cylindrical bearing surface of said piston and said servomotor including a unidirectional clutch device that is activated when an input force is applied to said control rod at a predetermined speed to lock said actuating rod in relation to the said piston in an end front axial position in which a corresponding reaction force is transmitted to said piston, independently of the reaction disk and independently of a position of said plunger and said control rod, said unidirectional clutch device including an expandable means for an axial insertion, in the active position, between said piston and said rear end of said actuating rod to lock said actuating rod in said end front axial position.

2. The pneumatic servomotor according to claim 1, characterised in that said finger-forming front end of said plunger includes a free end section that is slidably fitted within a complementary front bore in said piston.

3. The pneumatic servomotor according to claim 1, characterised in that said actuation piston has a rear pawl that extends axially rearwards from a bottom rear face of the cup and passes through said reaction disk and is accommodated with an axial clearance within a blind axial hole provided in said plunger to let said plunger bias directly the actuating rod towards a front end position when an input force is exerted at said predetermined high speed.

4. The pneumatic servomotor according to claim 1, characterised in that said expandable means of said unidirectional clutch device comprise at least one ring, made of an elastomeric material and glued about said cylindrical bearing surface of said piston and about said cup, said ring being deformable between an expanded radial position, that corresponds to an inactive position of said unidirectional clutch device, and a compressed radial position, that corresponds to the active position of said unidirectional clutch device to lock said cup in an advanced position to correspondingly position said actuating rod at an end front axial position in relation to said piston.

5. The pneumatic servomotor according to claim 4, characterised in that said actuating rod has a rear pawl mounted with a determined clearance relative to a bottom of the blind hole in said plunger so that when the input force is applied at a determined high speed said plunger pushes said cup in a forward direction by a predetermined distance and as a result a given space is made available for an immediate occupancy by said elastomeric ring, said elastomeric ring being radially biased into compression by a rear inner bevel in a tubular sleeve that is slidably mounted and resiliently returned about said cylindrical bearing surface located in a coaxial bore of said piston.

6. The pneumatic servomotor according to claim 5, characterised in that said unidirectional clutch device comprises means for the forward driving of said tubular sleeve against said return means when an input force on said control rod is released to also release said unidirectional clutch device.

7. The pneumatic servomotor according to claim 6, characterised in that said piston includes a substantially radially directed cavity that receives a key, said key being slidingly fitted on said plunger and comprising first and second opposite branches that protrude out of said cavity and respectively abut against first and second walls of said casing when said control rod is in a rest position, said key with said control rod in said rest position having a front face of one of said first and second branches acting on and biasing a slide in a forward direction, said slide being slidingly fitted inside a bore located in said piston and facing a rear edge of said tubular sleeve in such a manner that when an input force is released, said tubular sleeve is driven in a forward direction against said return means.

8. The pneumatic servomotor according to claim 1, characterised in that said expandable means of said unidirectional clutch device comprise several balls located at regular angular spacing about a cylindrical bearing surface of said piston, said balls being fitted to be movable between a radial position away from an axis of said moving piston during an inactive position of said unidirectional clutch device and to a radial position that is closer to said axis of said piston during an active position of said unidirectional clutch device, said balls axially moving between a rear end face of said cup and a front face of said piston to lock said actuating rod in a end front axial position in relation to said piston.

9. The pneumatic servomotor according to claim 8, characterised in that said actuating rod has a rear pawl that is mounted with a predetermined clearance relative to a bottom of a blind hole located said plunger, in such a way that, when an input force is exerted at a predetermined speed, said plunger pushes said cup in the forward direction by a determined distance and as a result said balls come into axial contact with cylindrical bearing surface of said piston between said rear end face of said cup and said front face of said piston.

10. The pneumatic servomotor according to claim 9, characterised in that said rear end face of said cup has a bevel surface that provides a support for said balls in an inactive position of said unidirectional clutch device and guides said balls into contact with said cylindrical bearing surface of said piston in an active position of said unidirectional clutch surface.

11. The pneumatic servomotor according to claim 10, characterised in that said expandable means comprise a tubular sleeve that is a slidably fitted about said cylindrical bearing surface in a coaxial bore provided in said piston, said sleeve being resiliently at right angles with respect to said balls, said rear inner bevel maintaining said balls in a remote radial position whereby said balls rest on said bevel-forming rear end face of said cup and on a supporting washer contacting said front face of said piston in the inactive position of said unidirectional clutch device and biases said balls towards a closer radial position to all said balls to come between said bevel-forming rear end face of said cup and said washer and into contact with said cylindrical bearing surface of said piston in the active position of said unidirectional clutch device.

12. A pneumatic servomotor for an assisted braking of a motor vehicle, said servomotor having a rigid casing with a movable transverse partition wall therein that defines in an airtight manner a front chamber under a first engine negative pressure and a rear chamber under a second pressure, and second pressure varying between said first pressure and atmospheric pressure; said movable wall including an integral piston that biases a rear end of an actuating rod for a brake master cylinder, said actuating rod being slidably arranged in relation to said piston against a first return spring mounted inside said front chamber; and a control rod that moves inside of said piston in a selective manner as a function of an axial input force exerted in the forward direction against a return force applied to said control rod by a second return spring; said control rod being biased towards either an intermediate actuation position of an end actuation position resulting from the applying of said input force at a predetermined high speed; a plunger, arranged at a front part of said control rod inside of said piston, and a three-way valve, including at least an annular seat borne by a rear section of said plunger, and said three-way valve varying the second pressure prevailing within said rear chamber particularly by connecting said front chamber with said rear chamber when said control rod is in a rest position and by gradually connecting said rear chamber with atmospheric pressure when said control rod is actuated by an input force; said plunger having a finger-forming front end that biases a reaction disk integral with a rear end of said actuating rod in an end actuating position for said control rod to transmit the reaction force from said actuating rod through said plunger into said control rod; characterised in that said finger-forming front end of said plunger includes a free end section that is slidably fitted within a complementary front bore in said piston; and said piston has a front bore that opens into a cup that is integral with a rear end of said actuating rod, said cup receiving said reaction disk and is slidably mounted on a cylindrical bearing surface of said piston; and said servomotor includes a unidirectional clutch device that is activated when an input force is applied to said control rod at a predetermined speed to lock said actuating rod in relation to the said piston in an end front axial position in which a corresponding reaction force is transmitted to said piston, independently of the reaction disk and independently of a position of said plunger and said control rod.

* * * * *